(12) United States Patent
Gibson

(10) Patent No.: US 11,675,221 B1
(45) Date of Patent: Jun. 13, 2023

(54) ACTIVE PHOTONIC DEVICES WITH ENHANCED POCKELS EFFECT VIA ISOTOPE SUBSTITUTION

(71) Applicant: Psiquantum, Corp., Palo Alto, CA (US)

(72) Inventor: Gary Gibson, Palo Alto, CA (US)

(73) Assignee: Psiquantum, Corp., Palo Alto, CA (US)

( * ) Notice: Subject to any disclaimer, the term of this patent is extended or adjusted under 35 U.S.C. 154(b) by 0 days.

(21) Appl. No.: 17/673,696

(22) Filed: Feb. 16, 2022

Related U.S. Application Data

(63) Continuation of application No. 16/903,285, filed on Jun. 16, 2020, now Pat. No. 11,256,115.

(60) Provisional application No. 62/864,975, filed on Jun. 21, 2019.

(51) Int. Cl.
*G02F 1/035* (2006.01)
*G02F 1/225* (2006.01)
*G02F 1/21* (2006.01)

(52) U.S. Cl.
CPC ............ *G02F 1/035* (2013.01); *G02F 1/225* (2013.01); *G02F 1/212* (2021.01); *G02F 2202/105* (2013.01)

(58) Field of Classification Search
None
See application file for complete search history.

(56) References Cited

U.S. PATENT DOCUMENTS

| | | | |
|---|---|---|---|
| 6,411,762 B1 | 6/2002 | Anthon et al. | |
| 6,490,399 B1 * | 12/2002 | Heitmann | C03C 3/06 385/141 |
| 6,810,197 B2 * | 10/2004 | Allan | C03B 37/01807 385/142 |
| 7,119,400 B2 | 10/2006 | Burden | |
| 9,014,524 B2 | 4/2015 | Bell | |
| 9,151,888 B2 * | 10/2015 | Mori | G02B 6/028 |

(Continued)

FOREIGN PATENT DOCUMENTS

GB 2379994 A 3/2003

OTHER PUBLICATIONS

EP20773694.3, "Extended European Search Report", dated Oct. 20, 2022, 9 pages.

(Continued)

*Primary Examiner* — Rhonda S Peace

(74) *Attorney, Agent, or Firm* — Kilpatrick Townsend & Stockton LLP

(57) ABSTRACT

An optical switch structure includes a substrate, a first electrical contact, and a first material having a first conductivity type electrically connected to the first electrical contact. The optical switch structure also includes a second material having a second conductivity type coupled to the first material, a second electrical contact electrically connected to the second material, and a waveguide structure disposed between the first electrical contact and the second electrical contact. The waveguide structure includes a waveguide core coupled to the substrate and including a core material characterized by a first index of refraction and a waveguide cladding at least partially surrounding the waveguide core and including a cladding material characterized by a second index of refraction less than the first index of refraction and an isotope-enhanced Pockels effect.

13 Claims, 10 Drawing Sheets

(56) References Cited

U.S. PATENT DOCUMENTS

| | | | |
|---|---|---|---|
| 10,627,696 B1 | 4/2020 | Chang et al. | |
| 11,036,111 B2 | 6/2021 | Chang et al. | |
| 2002/0071622 A1 | 6/2002 | Betts et al. | |
| 2003/0002834 A1* | 1/2003 | Brown | G02B 6/03694 |
| | | | 385/124 |
| 2003/0013275 A1 | 1/2003 | Burden | |
| 2003/0039865 A1 | 2/2003 | Kelsey et al. | |
| 2004/0151463 A1 | 8/2004 | Talin et al. | |
| 2007/0154137 A1 | 7/2007 | Mino et al. | |
| 2008/0157157 A1 | 7/2008 | Tonomura et al. | |
| 2011/0215344 A1 | 9/2011 | Dardy et al. | |
| 2014/0060178 A1 | 3/2014 | Wong et al. | |
| 2017/0146887 A1 | 5/2017 | Timurdogan et al. | |
| 2017/0299811 A1 | 10/2017 | Wessels et al. | |
| 2018/0373067 A1 | 12/2018 | Fujikata | |
| 2021/0124233 A1 | 4/2021 | Liang et al. | |

OTHER PUBLICATIONS

Abel, "Electro-Optic Photonic Devices Based on Epitaxial Barium Titanate Thin Films on Silicon", Photonic Universite Grenoble Alpes, Nov. 17, 2015, 243 pages.

Gehl, et al., "Operation of High-Speed Silicon Photonic Micro-Disk Modulators at Cryogenic Temperatures", Optica, vol. 4, No. 3, Mar. 16, 2017, pp. 374-382.

PCT/US2020/023196, "International Search Report and Written Opinion", dated Jun. 19, 2020, 14 pages.

Timurdogan, et al., "Electric Field-Induced Second-Order Nonlinear Optical Effects in Silicon Waveguides", Nature Photonics, vol. 11, Mar. 2017, pp. 200-206.

Vuong, et al., "Isotope Engineering of Van Der Waals Interactions in Hexagonal Boron Nitride", Nature Materials, vol. 17, Feb. 2018, pp. 152-158.

U.S. Appl. No. 17/326,233, "Notice of Allowance", dated Nov. 21, 2022, 7 pages.

* cited by examiner

US 11,675,221 B1

ACTIVE PHOTONIC DEVICES WITH ENHANCED POCKELS EFFECT VIA ISOTOPE SUBSTITUTION

CROSS-REFERENCES TO RELATED APPLICATIONS

This application is a continuation of U.S. patent application Ser. No. 16/903,285, filed Jun. 16, 2020; which claims the benefit of priority to U.S. Provisional Patent Application No. 62/864,975, filed on Jun. 21, 2019, the disclosures of which are hereby incorporated by reference in their entirety for all purposes.

BACKGROUND OF THE INVENTION

Electro-optic (EO) modulators and switches have been used in optical fields. Some EO modulators utilize free-carrier electro-refraction, free-carrier electro-absorption, or the DC Kerr effect to modify optical properties during operation, for example, to change the phase of light propagating through the EO modulator or switch. As an example, optical phase modulators can be used in integrated optics systems, waveguide structures, and integrated optoelectronics.

Despite the progress made in the field of EO modulators and switches, there is a need in the art for improved methods and systems related to EO modulators and switches.

SUMMARY OF THE INVENTION

Embodiments of the present invention generally relate to photonic devices. More particularly, embodiments of the present invention relate to active photonic devices utilized as components of optical modulators and optical switches. In a particular embodiment, active photonic devices with low optical loss and reduced switching energies are provided that include waveguide core or waveguide cladding materials characterized by a Pockels effect that is increased via isotope substitution. These materials characterized by an isotope-enhanced effect can be utilized to improve modulation and/or switching performance. The present invention has applicability to a wide variety of photonic and opto-electronic devices.

According to an embodiment of the present invention, a waveguide structure is provided. The waveguide structure includes a substrate, a waveguide core coupled to the substrate and including a first material characterized by a first index of refraction, and an isotope-enhanced cladding layer at least partially surrounding the waveguide core and including a second material characterized by a second index of refraction less than the first index of refraction and an isotope-enhanced Pockels effect.

According to another embodiment of the present invention, an optical switch structure is provided. The optical switch structure includes a substrate and a waveguide structure coupled to the substrate. The optical switch structure also includes a set of electrodes positioned adjacent the waveguide structure. The set of electrodes are configured to establish an applied electric field having a component oriented along a lateral direction. The waveguide structure includes a waveguide core configured to support a guided mode and propagating along a longitudinal direction orthogonal to the lateral direction and including a first material characterized by a first index of refraction. The waveguide structure also includes an isotope-enhanced waveguide cladding at least partially surrounding the waveguide core and including a second material characterized by a second index of refraction less than the first index of refraction and an isotope-enhanced Pockels effect higher than a Pockels effect of the second material with constituent materials having naturally occurring isotope percentages.

According to a specific embodiment of the present invention, a waveguide structure is provided. The waveguide structure includes a substrate and a waveguide core coupled to the substrate and including a first material characterized by a first index of refraction and an isotope-enhanced Pockels effect greater than a Pockels effect of the first material with constituent materials having naturally occurring isotope percentages. The waveguide structure also includes a cladding layer at least partially surrounding the waveguide core and including a second material characterized by a second index of refraction less than the first index of refraction.

According to a particular embodiment of the present invention, a semiconductor structure is provided. The semiconductor structure includes a silicon substrate structure and an isotope-enhanced layer coupled to the silicon substrate structure.

Numerous benefits are achieved by way of the present disclosure over conventional techniques. For example, embodiments of the present invention provide methods and systems that can utilize a reduced applied bias to achieve a given electric field in a waveguide core or waveguide cladding, thereby reducing power consumption and increasing efficiency. Moreover, by increasing the Pockels effect of the materials used to modulate the phase of light through changes in effective refractive index, embodiments of the present invention facilitate the use of lower voltages and/or smaller devices. This in turn, enables lower switching/operating voltages and reduced optical absorption. These and other embodiments of the disclosure along with many of its advantages and features are described in more detail in conjunction with the text below and attached figures.

DETAILED DESCRIPTION OF THE INVENTION

Embodiments of the present invention relate to optical systems. More particularly, embodiments of the present invention utilize isotope-enhanced Pockels effect materials (i.e., high-$\chi^{(2)}$ materials) in optical modulators and switches to reduce power consumption during operation. Merely by way of example, embodiments of the present invention are provided in the context of integrated optical systems that include active optical devices, but the invention is not limited to this example and has wide applicability to a variety of optical and optoelectronic systems.

According to some embodiments, the active photonic devices described herein utilize the Pockels effect to implement modulation and/or switching of optical signals. Thus, embodiments of the present invention are applicable to both modulators, in which the transmitted light is modulated either ON or OFF, or light is modulated with a partial change in transmission percentage, as well as optical switches, in which the transmitted light is output on a first output (e.g., waveguide) or a second output (e.g., waveguide) or an optical switch with more than two outputs, as well as more than one input. Thus, embodiments of the present invention are applicable to a variety of designs including an M(input)× N(output) systems that utilize the methods, devices, and techniques discussed herein.

Figure 1:
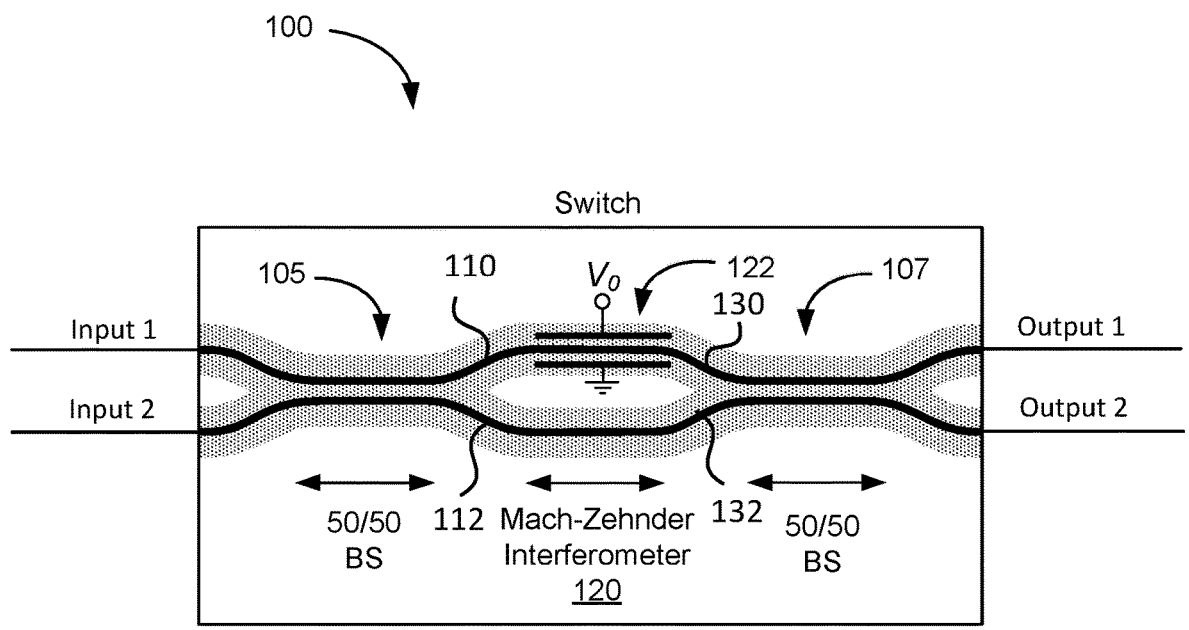
FIG. 1 is a simplified schematic diagram illustrating an optical switch according to an embodiment of the present invention.

FIG. 1 is a simplified schematic diagram illustrating an optical switch according to an embodiment of the present invention. Referring to FIG. 1, switch 100 includes two inputs: Input 1 and Input 2 as well as two outputs: Output 1 and Output 2. As an example, the inputs and outputs of switch 100 can be implemented as optical waveguides operable to support single mode or multimode optical beams. As an example, switch 100 can be implemented as a Mach-Zehnder interferometer integrated with a set of 50/50 beam splitters 105 and 107, respectively. As illustrated in FIG. 1, Input 1 and Input 2 are optically coupled to a first 50/50 beam splitter 105, also referred to as a directional coupler, which receives light from the Input 1 or Input 2 and, through evanescent coupling in the 50/50 beam splitter, directs 50% of the input light from Input 1 into waveguide 110 and 50% of the input light from Input 1 into waveguide 112. Concurrently, first 50/50 beam splitter 105 directs 50% of the input light from Input 2 into waveguide 110 and 50% of the input light from Input 2 into waveguide 112. Considering only input light from Input 1, the input light is split evenly between waveguides 110 and 112.

Mach-Zehnder interferometer 120 includes phase adjustment section 122. Voltage $V_0$ can be applied across the waveguide in phase adjustment section 122 such that it can have an index of refraction in phase adjustment section 122 that is controllably varied. Because light in waveguides 110 and 112 is in-phase after propagation through the first 50/50 beam splitter 105, phase adjustment in phase adjustment section 122 can introduce a predetermined phase difference between the light propagating in waveguides 130 and 132. As will be evident to one of skill in the art, the phase relationship between the light propagating in waveguides 130 and 132 can result in output light being present at Output 1 (e.g., light beams are in-phase) or Output 2 (e.g., light beams are out of phase), thereby providing switch functionality as light is directed to Output 1 or Output 2 as a function of the voltage $V_0$ applied at the phase adjustments section 122. Although a single active arm is illustrated in FIG. 1, it will be appreciated that both arms of the Mach-Zehnder interferometer can include phase adjustment sections.

As illustrated in FIG. 1, electro-optic switch technologies, in comparison to all-optical switch technologies, utilize the application of the electrical bias (e.g., $V_0$ in FIG. 1) across the active region of the switch to produce optical variation. The electric field and/or current that results from application of this voltage bias results in changes in one or more optical properties of the active region, such as the index of refraction or absorbance. In addition to the power dissipated by current flow (in the cases where a current results from the application of the bias voltage), energy is dissipated by the creation of the electric field, which has an energy density of $E^2\kappa/8\pi$ (cgs units), where E is the electric field and $\kappa$ is the dielectric constant.

Although a Mach-Zehnder interferometer implementation is illustrated in FIG. 1, embodiments of the present invention are not limited to this particular switch architecture and other phase adjustment devices are included within the scope of the present invention, including ring resonator designs, Mach-Zehnder modulators, generalized Mach-Zehnder modulators, and the like. One of ordinary skill in the art would recognize many variations, modifications, and alternatives.

The inventors have determined that because the energy density is higher in regions with a high dielectric constant, incorporation of isotope-enhanced Pockels effect materials into the electro-optic switch architecture can reduce the overall power consumption of the electro-optic switch since the dielectric tensor components scale roughly linearly with the Pockels tensor coefficients. As a result, the energy used to switch the electro-optic switch will generally scale as the dielectric constant over the square of the effective Pockels coefficient, thereby resulting in reduced power consumption as the Pockels effect and the dielectric constant increase.

Figure 2:
FIG. 2 is a simplified schematic diagram showing a top view of an active waveguide region according to an embodiment of the present invention.

FIG. 2 is a simplified schematic diagram showing a top view of an active waveguide region according to an embodiment of the present invention. In FIG. 2, metal electrodes 210 and 212 are positioned on either side of waveguide core 220, which is disposed between waveguide cladding regions 222 and 224. In this implementation, the waveguide core 220 is fabricated using silicon and the waveguide cladding regions 222 and 224 are fabricated using silicon dioxide. The dielectric constants of the materials are represented by the $\kappa$ values of 11.7 for Si and 3.9 for $SiO_2$. The thickness of the layers (i.e., $d_{Si}$ and $d_{ox}$) as well as the electric field in each layer (i.e., $E_{Si}$ and $E_{ox}$) are also illustrated.

When an electric field is applied across the waveguide structure by the application of a voltage bias to the metal electrodes 210 and 212, the index of refraction in the waveguide core 220 and the waveguide cladding regions 222 and 224 is altered, through the DC Kerr effect. As described in relation to FIG. 1, incorporation of an active region (i.e., a phase adjustment section) as illustrated in FIG. 2 can be utilized to implement an electro-optic switch.

Because the displacement field perpendicular to the layers (D=κE) must be continuous, $E_{Si}=(3.9/11.7) E_{ox}=E_{ox}/3$.

Thus, a significant portion of the electric field bias applied across the phase adjustment section device is dropped across the silicon dioxide cladding regions 222 and 224, which have low-κ values in comparison to the silicon waveguide core, thereby failing to produce the desired index of refraction change in the silicon waveguide core as the bias is dropped across the low-κ silicon dioxide layers. Given typical values for the waveguide layers designed to operate at 1.55 μm of $d_{Si}$=0.5 μm and $d_{ox}$=0.5 μm, which is approximately the minimum distance suitable for avoiding optical absorption by the metal electrodes, the potential drop across the silicon layer for an applied voltage bias of $V_0$ is only $V_0/7$. Thus, 6/7 of the applied voltage bias is dropped across the silicon oxide layers.

The capacitance of the device schematically illustrated in FIG. 2 per unit area is C/A=1.67/4πd, in the case where $d=d_{ox}=d_{Si}$ and the layer capacitances are added in series using cgs units. If the $SiO_2$ is replaced with a high-K dielectric the power consumption during operation is reduced significantly. In an embodiment, hafnium dioxide ($HfO_2$) is utilized in place of the silicon dioxide cladding layers. Assuming a typical dielectric constant for $HfO_2$ of 39, the potential drop across the silicon waveguide core becomes 5V/8 because, $E_{Si}=(39/11.7) E_{ox}=10E_{ox}/3$.

The capacitance/area becomes C/A=7.35/4πd. Thus, replacing the silicon dioxide cladding layers with hafnium dioxide cladding layers enables embodiments of the present invention to lower the applied bias $V_0$ by a factor of (5/8)/(1/7)=35/8 while maintaining the same electric field in the silicon waveguide core, thereby achieving the same switching effect. Power reductions of this sort are of particular benefit to cryogenic electro-optic switches due to the difficulty in creating high voltage drivers that operate at low temperatures.

Because the energy per unit area required to charge the capacitance is equal to 0.5 $CV^2/A$, replacing the silicon dioxide cladding layers with hafnium dioxide cladding layers reduces the required switching energy by a factor of $(1.67/7.35)*(35/8)^2$=4.4. Thus, embodiments of the present invention enable substantial energy savings over conventional designs. One of skill in the art will appreciate that the model discussed in relation to FIG. 2 is utilized merely to demonstrate the impact of utilizing high-κ dielectric materials in active devices since actual device geometries will not typically achieve benefits associated with the schematic system illustrated in FIG. 2. There will, however, still be significant advantages for typical device designs, including both carrier and Kerr based switches, because the high-κ dielectric can be used to force higher electric fields in the lower κ active area of the device while reducing or minimizing the overall required energy.

Although the discussion in relation to FIG. 2 has been provided in relation to the voltage and electric field being applied in the plane of the figure, this is not required by the present invention and other embodiments that are implemented in a "vertical" design are included within the scope of the present invention. Accordingly, the various materials can be formed using epitaxial growth, deposition, layer transfer, or the like to fabricate a structure in which the electric field is directed from upper layers of the structure to bottom layers or vice versa. One of ordinary skill in the art would recognize many variations, modifications, and alternatives.

Figure 3:
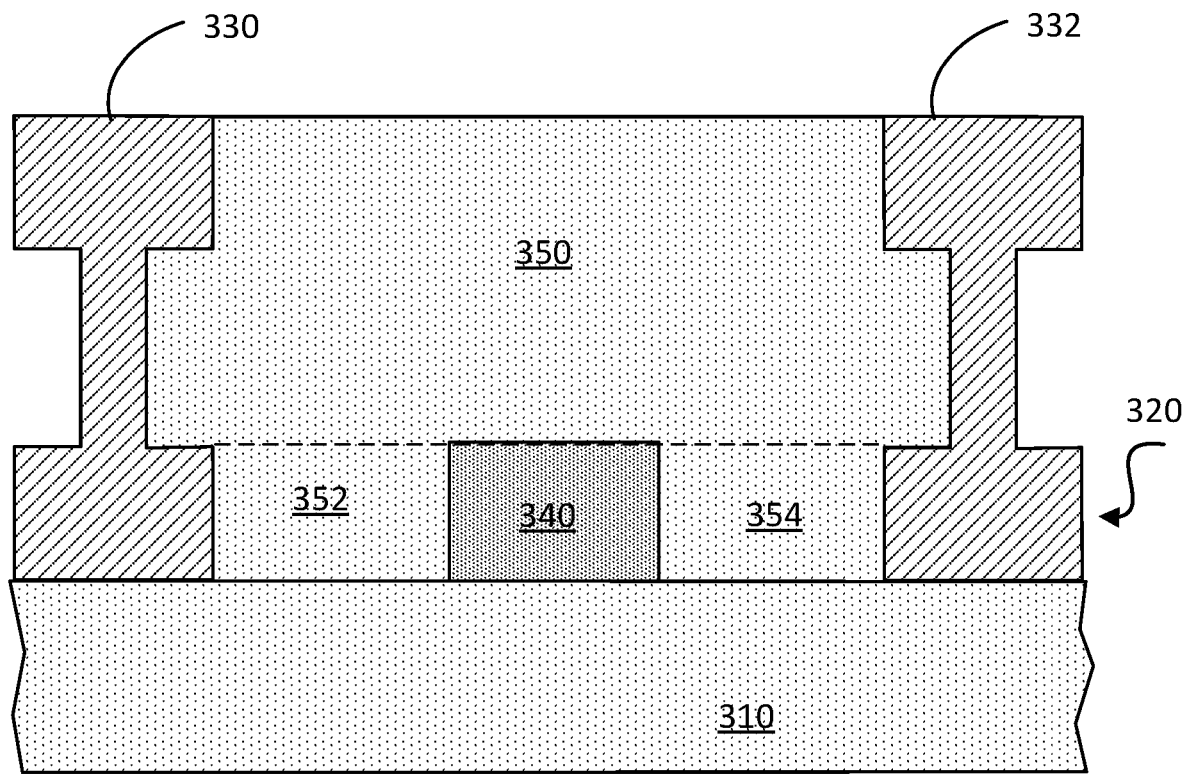
FIG. 3 is a simplified schematic diagram illustrating a dielectric-waveguide-dielectric structure incorporating isotope-enhanced materials according to an embodiment of the present invention.

FIG. 3 is a simplified schematic diagram illustrating a dielectric-waveguide-dielectric structure incorporating isotope-enhanced Pockels effect materials according to an embodiment of the present invention.

Referring to FIG. 3, the cross-section of the dielectric-waveguide-dielectric structure includes an illustration of substrate 310, which supports waveguide layer 320, which includes waveguide core 340. In some embodiments, substrate 310 is the buried oxide (BOX) layer of a silicon-on-insulator (SOI) structure, although this is not required by the present invention. Metal contacts 330 and 332 are provided to enable application of a voltage bias across silicon waveguide core 340. Dielectric region 352, dielectric region 354, and/or cladding material 350 disposed adjacent silicon waveguide core 340 can be fabricated using an isotope-enhanced Pockels effect material, for example, isotope-enhanced $BaTiO_3$ (BTO), isotope-enhanced $PbZr_xTi_{1-x}O_3$ (PZT), isotope-enhanced $SrBi_2Nb_2O_9$ (SBN), combinations thereof, or the like. In other embodiments, materials that are characterized by high dielectric constant (κ), for example, hafnium oxide ($HfO_2$), tantalum oxide ($Ta_2O_5$), zirconium oxide ($ZrO_2$), titanium dioxide ($TiO_2$), other refractory metal oxides, combinations thereof, or the like can be utilized as isotope-enhanced dielectric regions, cladding materials, or isotope-enhanced waveguide core materials. As described more fully herein, BTO, PZT, SBN, and the like can also be used for the waveguide core material in conjunction with a suitable cladding material, for example, a higher refractive index material for an index-guided waveguide or, in some embodiments, a lower index material for a slot waveguide architecture.

In order to vary the index of refraction in waveguide core 340, a voltage bias is applied using metal contacts 330 and 332, also referred to as electrodes. Since there is no current conduction path in the dielectric-waveguide-dielectric structure, the bias applied to the electrodes will be dropped across dielectric region 352 between metal contact 330 and waveguide core 340, waveguide core 340, and dielectric region 354 between waveguide core 340 and metal contact 332. As will be evident to one of skill in the art, the optical mode present in waveguide core 340 extends into dielectric regions 352, 354, and cladding material 350, all of which can exhibit the Pockels effect enhanced by isotope substitution. As described herein, embodiments of the present invention utilize materials characterized by an isotope-enhanced Pockels effect (which results from a large second order non-linear susceptibility, $\chi^{(2)}$).

As described herein, some embodiments of the present invention utilize waveguide cladding materials including isotope-enhanced Pockels effect material, also referred to as isotope-enhanced material, whereas in other embodiments, waveguide core 340 can also include isotope-enhanced Pockels effect material. Thus, in a first embodiment, waveguide core 340 is fabricated using a silicon waveguide material while cladding material 350 and/or dielectric regions 352 and 354 are fabricated using an isotope-enhanced Pockels effect material. In a second embodiment, waveguide core 340 is fabricated using an isotope-enhanced Pockels effect material while cladding material 350 and/or dielectric regions 352 and 354 are fabricated using lower index dielectric materials, for example, silicon oxide or silicon nitride. Moreover, in addition to ridge waveguide structures, slot waveguide structures are included within the scope of the present invention.

Applying a bias to metal contacts 330 and 332 (i.e., electrodes) results in charging of device capacitance. Typically, this capacitance will scale with the length of the section of waveguide over which the refractive index is being modulated. Charging or discharging this capacitance requires an energy of ½ $CV^2$, where C is the device capacitance and V is the bias applied across the device capacitance. Increasing the strength of the Pockels effect reduces the electric field required to obtain a desired optical phase shift. This allows one to either reduce the applied bias or shorten the length of the region to which it is applied, thereby lowering the device capacitance. Lowering the bias or decreasing the capacitance reduces the energy required to switch the state of the device. Decreasing the optical path length reduces the optical loss in the device.

The strength of the Pockels effect in a switch or modulator can be characterized by an effective Pockels coefficient, $r_{eff}$, where the change in refractive index is given by $\Delta n = r_{eff} E$. Here, E is the electric field applied to the active region of the device. More generally, the Pockels effect is described by a third rank tensor with components, $r_{ijk}$. Formally, this tensor is defined by:

$$\Delta\left(\frac{1}{\varepsilon}\right)_{ij} = \sum_k r_{ijk} E_k,$$

where $\varepsilon$ is the high frequency dielectric tensor and $E_k$ refers to the components of the electric field. The effective Pockels coefficient of a switch, $r_{eff}$, is a weighted average of the tensor components that depends on the device geometry and propagating optical mode. The tensor components, in turn, are the sum of contributions from electronic, ionic, and piezoelectric effects. In many cases the ionic contribution $r_{ijk}^{ion}$, which is given by the equation below, dominates:

$$r_{ijk}^{ion} = \frac{-4\pi}{\sqrt{V} n_{ii}^2 n_{jj}^2} \sum_m \frac{\alpha_{ij}^m p_k^m}{\omega_m^2}$$

where $\omega_m$ represent phonon frequencies. As indicated by this dependence, the Pockels effect is highly dependent on phonon frequencies. In fact, it can be enhanced near phase transitions where 'phonon mode softening' leads to small phonon frequencies. The frequency of the phonon modes also depends on the mass of the atoms involved in the mode. In general, the phonon frequency scales inversely as the square root of the mass (Cardona, Rev. of Mod. Phys. 77, 1173 (2005)). Therefore, by replacing atoms in a Pockels material with isotopes of a different (i.e., higher) mass, embodiments of the present invention produce a strong impact on the Pockels tensor, as well as the temperatures at which it peaks (i.e., the temperatures at which structural phase transitions occur). Accordingly, some embodiments of the present invention enhance the Pockels effect (i.e., by enhancing the relevant Pockels tensor components) in films used in optical switches by substituting different isotopes for the constituent atomic species with isotopes of higher mass. In other embodiments, isotopes are substituted such that isotopes of a smaller mass are used in the substitution, thereby enhancing the Pockels effect in these embodiments.

Using BTO as an example, the titanium atom at the center of the unit cell is perhaps most important in phonon modes that impact the Pockels tensor. This is because displacement of the titanium atom from the center of the BTO unit cell is the primary source of the polarization of BTO. Titanium has five stable, naturally occurring isotopes ($^{46}$Ti to $^{50}$Ti), with abundances ranging from 5% ($^{50}$Ti) to 74% ($^{48}$Ti). These isotopes are commercially available and could be utilized in most thin film deposition techniques. Similarly, oxygen has three stable isotopes ($^{16}$O to $^{18}$O) and $^{18}$O is readily available commercially and could be substituted for $^{16}$O in the deposition of BTO or other oxygen containing Pockels materials. Moreover, barium has six stable isotopes that could be used to alter the Pockels tensor of BTO. One or more of the constituent atoms in the materials with the desired high Pockels effect can be substituted with heavier isotopes, for example, $^{50}$Ti can be substituted for $^{46}$Ti as well as one or more of the other naturally isotopes having lower mass. Thus, the BTO can be fabricated such that $^{50}$Ti is substituted in place of the naturally occurring percentages of $^{46}$Ti, $^{47}$Ti, $^{48}$Ti, and $^{49}$Ti. However, embodiments of the present invention are not limited to substitution of a single constituent atom and multiple constituent atoms can be substituted, for example, $^{50}$Ti in place of one or more of $^{46}$Ti, $^{47}$Ti, $^{48}$Ti or $^{49}$Ti, and $^{18}$O in place of $^{16}$O or $^{17}$O, or substitution of all three constituent elements: $^{50}$Ti in place of one or more of $^{46}$Ti, $^{47}$Ti, $^{48}$Ti, or $^{49}$Ti, and $^{18}$O in place of $^{16}$O or $^{17}$O, and $^{138}$Ba in place of one or more of $^{130}$Ba, $^{132}$Ba, $^{134}$Ba, $^{135}$Ba, $^{136}$Ba, and/or $^{137}$Ba. Thus, embodiments of the present invention utilize substitution of one or more naturally occurring isotopes of constituent elements in the fabrication of Pockels materials.

Moreover, in addition to complete substitution of the constituent atoms, partial substitution can also be utilized. The inventors have determined that not only the increase in mass resulting from the isotopic substitution, for example, the percentage increase in mass resulting from the substitution of $^{18}$O in place of $^{16}$O, but the position of the constituent atom in the crystal structure can impact the enhancement of the Pockels effect. One of ordinary skill in the art would recognize many variations, modifications, and alternatives.

In addition to increasing the Pockels effect, isotopes can be used to decrease the low frequency dielectric constant. The energy utilized to switch an electro-optic switch can be lowered if the low frequency dielectric constant of the Pockels effect material is reduced because the device capacitance varies linearly with dielectric constant. It should be noted that in some embodiments, reduction of the dielectric constant is achieved in conjunction with an increase in the Pockels effect or a decrease in the Pockels effect less than the decrease in the dielectric constant. Lowering the dielectric constant by isotope substitution as described herein can thus be utilized for materials that are not being utilized to provide the Pockels effect, for example, the cladding material in some embodiments. Like the Pockels tensor coefficients, the low frequency dielectric constant depends on the inverse square of the phonon frequencies:

$$\varepsilon_{\alpha\beta}^0 = \varepsilon_{\alpha\beta}^\infty + \frac{4\pi e^2}{M_0 V} \sum_\lambda \frac{\tilde{Z}_{\lambda\alpha}^* \tilde{Z}_{\lambda\beta}^*}{\omega_{m\lambda}^2}$$

Therefore, substituting isotopes in a material will tend to drive the effective Pockels coefficient and the low frequency dielectric constant in the same direction, albeit at different rates. To optimize the switching energy, some embodiments maximize $$\frac{r_{eff}^2}{\varepsilon}.$$

Thus, appropriately changing the isotopic masses of the constituent atoms in a film can contribute to the optimization of this figure of merit as the ratio $$\frac{r_{\textit{eff}}^2}{\varepsilon}$$

is tuned. In some implementations, the effective Pockels coefficient and the low frequency dielectric constant will scale in a substantially linear manner with isotope substitution, resulting in a substantially linear increase in the ratio $$\frac{r_{\textit{eff}}^2}{\varepsilon}$$

with isotope substitution. Thus, embodiments of the present invention use isotopic substitution to increase the effective Pockels coefficient or tune the ratio $$\frac{r_{\textit{eff}}^2}{\varepsilon}$$

(e.g., to optimize switching energy). In other embodiments, as mentioned above, isotopic substitution is utilized to tune the dielectric constant, for example, in portions of the device in which the Pockels effect is not used, but a lower dielectric constant provides benefits, for example, with respect to device capacitance in regions substantially free of the optical mode.

As discussed above, the incorporation of the isotope-enhanced cladding material characterized by an isotope-enhanced Pockels effect or isotope-enhanced dielectric constant material will result in an increased percentage of the electric field being dropped across the waveguide core, thereby either increasing the index of refraction change at a given voltage bias or providing a given index of refraction change at a lower voltage bias.

It should be noted that a "vertical" implementation of the dielectric-waveguide-dielectric structure incorporating isotope-enhanced Pockels effect materials illustrated in FIG. 3 is included within the scope of the present invention. Dielectric region 352 and 354, as well as waveguide core 340 can be formed using epitaxial processes to form a vertical implementation that will share common elements with the embodiment illustrated in FIG. 3 and provide benefits of smaller device geometry as well as other benefits. One of ordinary skill in the art would recognize many variations, modifications, and alternatives.

Figure 4:
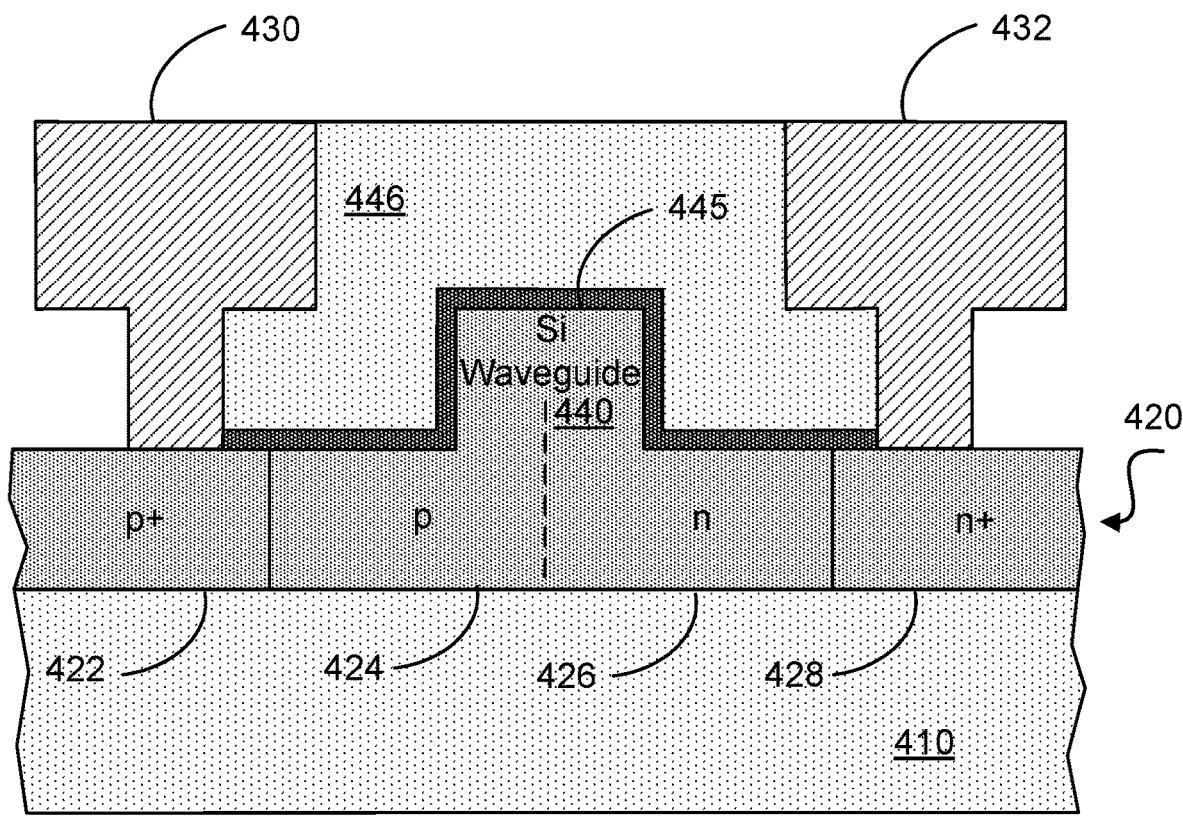
FIG. 4 is a simplified schematic diagram illustrating a p-n diode waveguide structure incorporating isotope-enhanced cladding materials according to an embodiment of the present invention.

FIG. 4 is a simplified schematic diagram illustrating a p-n diode waveguide structure incorporating isotope-enhanced cladding materials according to an embodiment of the present invention. Referring to FIG. 4, the cross-section of the p-n diode waveguide structure includes an illustration of substrate 410, which supports waveguide layer 420, which includes p+ contact region 422, p-type region 424, n-type region 426, and n+ contact region 428. In some embodiments, substrate 410 is the buried oxide (BOX) layer of a silicon-on-insulator (SOI) structure, although this is not required by the present invention. Metal contacts 430 and 432 are provided to enable application of a voltage bias across silicon waveguide core 440.

The cladding for the waveguide structure includes first isotope-enhanced cladding material 445 that is disposed above and on either side of silicon waveguide core 440 and second cladding material 446 that is disposed above and on either side of first isotope-enhanced cladding material 445. The first isotope-enhanced cladding material is characterized by an isotope-enhanced Pockels effect, for example, a Pockels effect that is greater than the Pockels effect associated with the same material fabricated using constituent materials having naturally occurring isotope percentages. As an example, silicon can be utilized as waveguide core material 440 and isotope-enhanced lead zirconate titanate $(Pb[Zr_{(x)}Ti_{(1-x)}]O_3)$ (PZT), isotope-enhanced barium titanate $(BaTiO_3$ (BTO)), isotope-enhanced strontium barium niobate $((Sr,Ba)Nb_2O_6)$, combinations thereof, or the like, can be utilized as first isotope-enhanced cladding material 445.

Although different materials are illustrated for first cladding material 445 and second cladding material 446, this is not required by the present invention and the same material can be utilized for both the first and second cladding layers. As an example, the entire cladding could be fabricated using isotope-enhanced barium titanate, in which case, there would be no distinction between the first cladding material and the second cladding material. In other embodiments, different compositions of the same material could be utilized as the first cladding material and the second cladding material. Moreover, although only two cladding layers are illustrated in FIG. 4, it will be appreciated that more than two cladding layers could be used, for example, a thin film of a first isotope-enhanced Pockels effect material (e.g., BTO), a thin film of a second isotope-enhanced Pockels effect material (e.g., PZT) deposited after the first cladding material, N additional thin films of subsequent cladding materials, and a blanket coating of a final cladding material. Moreover, although a single layer of the first cladding material is illustrated in FIG. 4, this single "layer" can be made up of multiple sub-layers of different materials or the same material. One of ordinary skill in the art would recognize many variations, modifications, and alternatives.

Thus, embodiments of the present invention utilize low-loss waveguide structures that are isotope-enhanced and can be produced using standard silicon photonics foundry processes.

According to embodiments of the present invention, the thickness of first cladding material 445 is sufficient to enable sufficient overlap between the optical mode and the first cladding material to achieve a desired variation in the effective index of refraction seen by the propagating waveguide optical mode upon application of an electric field. As an example, the thickness of first cladding layer 445 can range from about 10 nm to about 1 μm, for example, between tens of nanometers and hundreds of nanometers. As a result, the electric field lines extending from p-type region 424 to n-type region 426 will pass, not only through waveguide core 440, but through the first cladding material disposed on either side of the waveguide core, as well as through at least a portion of the first cladding material disposed above the waveguide core. As described herein, the incorporation of cladding material with isotope-enhanced Pockels effect enables increased variation in the index of refraction of the waveguide structure for a given voltage bias and applied electric field or a given variation in the index of refraction of the waveguide structure for a reduced voltage bias and applied electric field.

Figure 5:
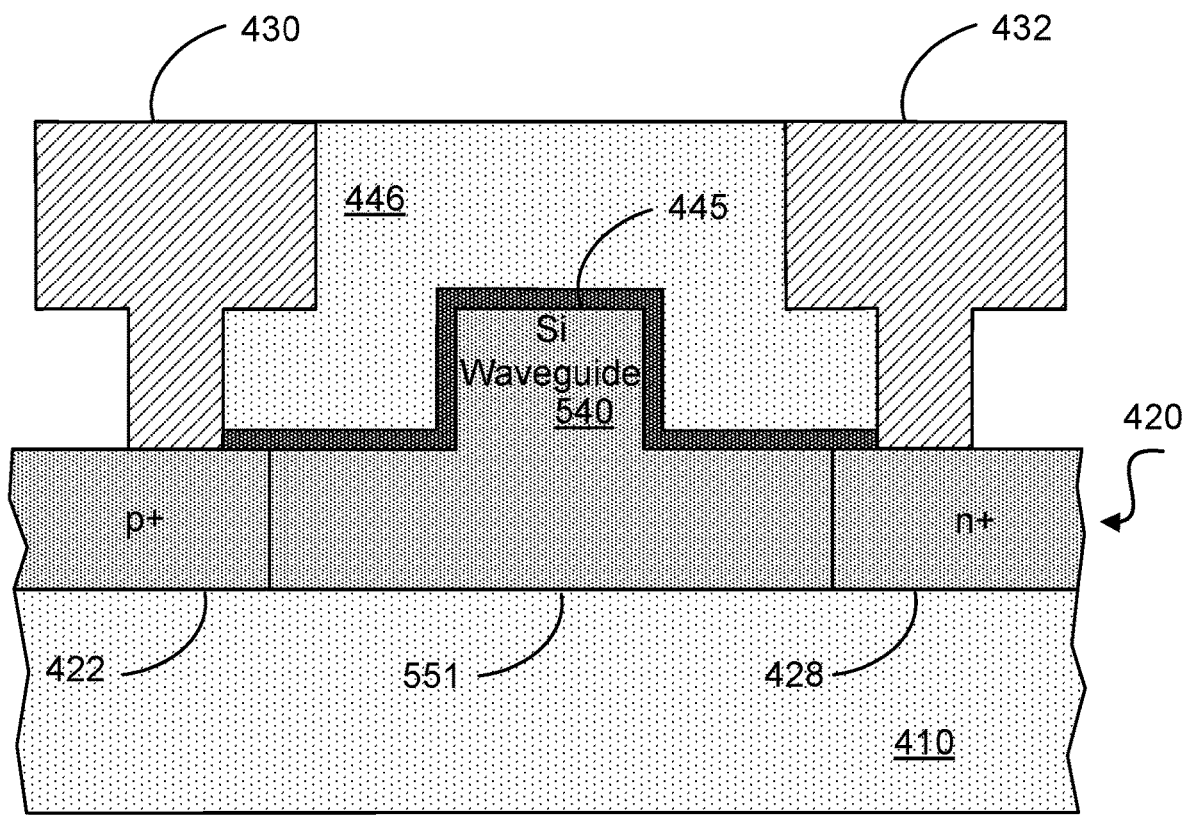
FIG. 5 is a simplified schematic diagram illustrating a waveguide structure incorporating isotope-enhanced cladding materials according to an embodiment of the present invention.

FIG. 5 is a simplified schematic diagram illustrating a waveguide structure incorporating isotope-enhanced Pockels effect materials according to an embodiment of the present invention. The embodiment illustrated in FIG. 5 is similar to that illustrated in FIG. 4, but does not utilize a p-n junction in waveguide core 540. Rather, undoped region 551 (e.g., undoped silicon) is utilized in waveguide core 540, which is an element of a pin junction structure. Otherwise, the description provided in relation to FIG. 4 is applicable to the embodiment illustrated in FIG. 5 as appropriate. As illustrated in FIG. 5, first isotope-enhanced cladding material 445 is characterized by an isotope-enhanced Pockels effect and second cladding material 446 can be fabricated using a dielectric such as silicon oxide or silicon nitride. One of ordinary skill in the art would recognize many variations, modifications, and alternatives.

Figure 6:
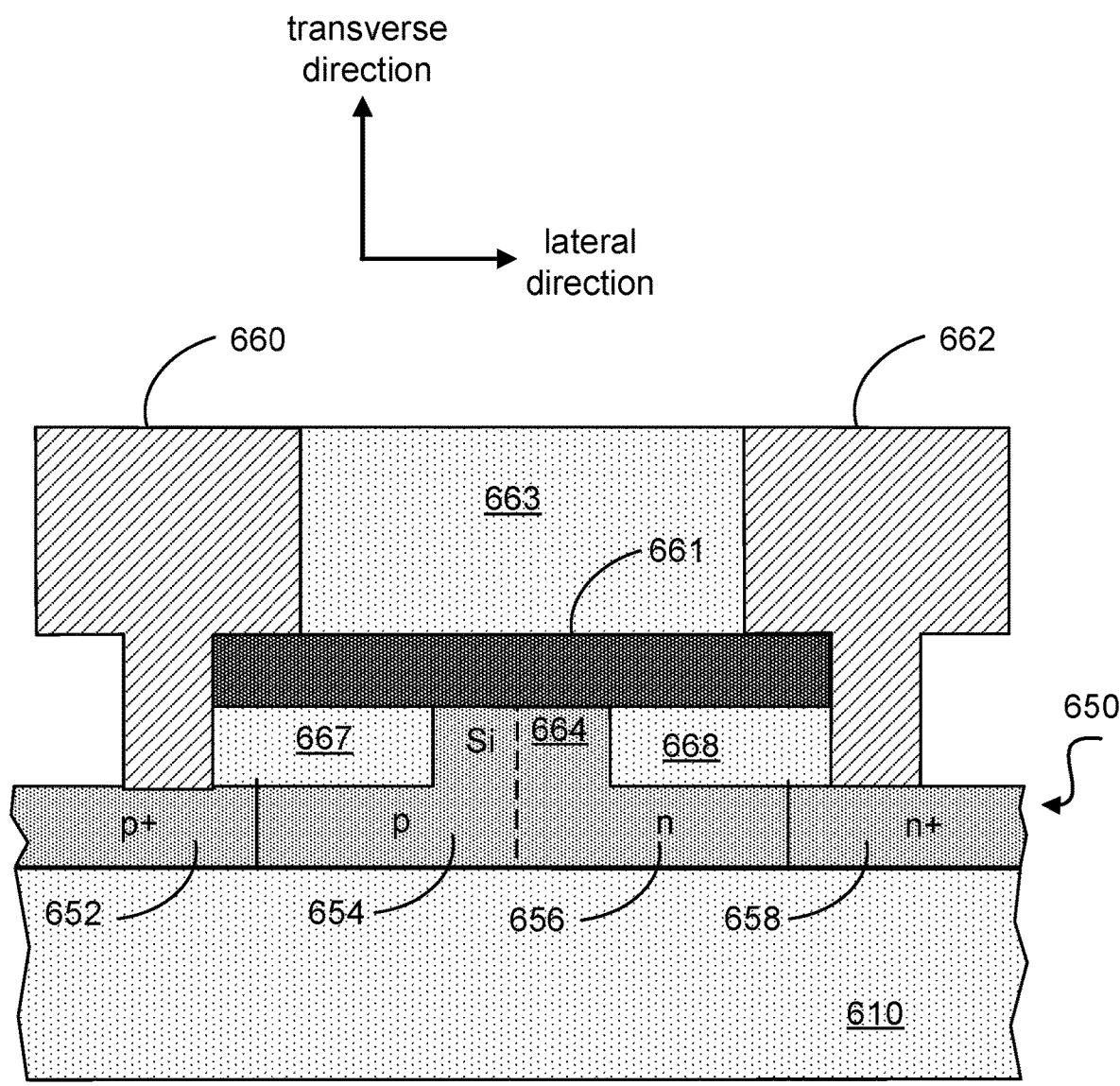
FIG. 6 is a simplified schematic diagram illustrating a p-n diode waveguide structure incorporating a planar isotope-enhanced cladding layer according to an embodiment of the present invention.

FIG. 6 is a simplified schematic diagram illustrating a p-n diode waveguide structure incorporating a planar isotope-enhanced layer according to an embodiment of the present invention. The structure illustrated in FIG. 6 shares common elements with the structures illustrated in FIG. 4 and the discussion provided in relation to FIG. 4 is applicable to the structure illustrated in FIG. 6 as appropriate. Referring to FIG. 6, the cross-section of the p-n diode waveguide structure includes an illustration of substrate 610, which supports waveguide layer 650, which includes p+ contact region 652, p-type region 654, n-type region 656, and n+ contact region 658. In some embodiments, substrate 610 is the buried oxide (BOX) layer of a silicon-on-insulator (SOI) structure, although this is not required by the present invention. Metal contacts 660 and 662 are provided to enable application of a voltage bias across the silicon waveguide core 664.

The waveguide core can be formed as a silicon ridge waveguide or other suitable waveguide structure. After formation of waveguide core 664, which can be a silicon waveguide core, a dielectric layer (e.g., $SiO_2$) is deposited and subsequently planarized to form a first portion of the waveguide cladding. As illustrated in FIG. 6, first dielectric region 667 and second dielectric region 668 are disposed on either lateral side of waveguide core 664. After planarization, an isotope-enhanced cladding layer 661 is formed as a second portion of the waveguide cladding using a material, in some embodiments, that has been isotopically enhanced as described herein. Isotope-enhanced cladding layer 661 can be deposited using a deposition process or can be transferred using a layer transfer process.

Isotope-enhanced cladding layer 661 is characterized by an isotope-enhanced Pockels effect that is greater than the Pockels effect associated with materials fabricated using constituent materials having naturally occurring isotope percentages. As an example, silicon can be utilized as waveguide core material 664, isotope-enhanced BTO can be utilized as isotope-enhanced cladding layer 661, and silicon dioxide ($SiO_2$) (or silicon nitride ($Si_3N_4$)) can be used as the material for first dielectric region 667 and second dielectric region 668 (i.e., the first portion of the waveguide cladding). In alternative embodiments, an isotope-enhanced Pockels material can also be utilized for first dielectric region 667 and second dielectric region 668. As illustrated in FIG. 6, one or more additional (optional) cladding layers 663 can be formed on the isotope-enhanced cladding layer to provide the desired optical confinement. As an example, silicon dioxide ($SiO_2$) can be deposited on isotope-enhanced cladding layer 661 to form an additional cladding layer. The cladding materials can utilize suitable materials as discussed in relation to FIG. 4.

Although different materials are illustrated in FIG. 6 for the first portion of the waveguide cladding and the second portion of the waveguide cladding, this is not required by the present invention and the same material can be utilized for both the first portion of the waveguide cladding and the second portion of the waveguide cladding. As an example, after formation of the ridge waveguide, isotope-enhanced BTO could be deposited and planarized to form the first portion of the waveguide cladding and the second portion of the waveguide cladding. Alternatively, after formation of the ridge waveguide, isotope-enhanced BTO could be deposited and planarized to form the first portion of the waveguide cladding. Subsequently, a layer transfer process could be utilized to position isotope-enhanced cladding layer 661 above the waveguide core. The discussion of alternative materials and structures as described in relation to FIG. 4 is applicable to the embodiment illustrated in FIG. 6 as appropriate. One of ordinary skill in the art would recognize many variations, modifications, and alternatives.

Because embodiments of the present invention utilize the Pockels effect, the crystal orientation of the electro-optic material can be controlled to align the applied electric field with respect to the crystal axes of the Pockels effect material in order to maximize the Pockels effect. Moreover, the polarization of the light propagating in the waveguide can be aligned with respect to the crystal axes of the isotope-enhanced Pockels effect material. Thus, alignment between the crystal axes and the applied electric field (e.g., at frequencies of gigahertz, for example, up to 100 GHz or higher, and below, which may be referred to as the "DC" electric field in contrast with optical frequencies) as well as alignment between the crystal axes and the electric field of the optical mode (e.g., at optical frequencies) are implemented according to some embodiments of the present invention. Moreover, the orientation of the waveguide (i.e. the propagation direction of the light) with respect to the crystallographic axes can also controlled in some embodiments.

For example, as illustrated in FIG. 6, isotope-enhanced cladding material 661 is characterized by crystal axes and the Pockels effect is characterized by a tensor. The crystal orientation of the isotope-enhanced cladding material, and the direction of propagation of the transmitted light and its polarization direction, can be aligned so that the largest coefficient of the Pockels tensor is utilized. As a result, the change in index of refraction produced by the application of the applied electric field is maximized. As will be evident to one of skill in the art, the maximization of these values is not required by the present invention and embodiments of the present invention include implementations in which coefficients of the Pockels effect tensors that are not the largest coefficients are utilized. These embodiments are included within the scope of the present invention.

Moreover, the polarization of the optical mode can be selected to align the electric field at optical frequencies with the largest value of the Pockels tensor. Referring to FIG. 6, if the polarization of the optical mode is a transverse electric (TE) mode, the optical electric field is polarized in the plane of the figure (e.g., along the lateral direction) and perpendicular to the longitudinal direction of the waveguide, which is normal to the plane of the figure and orthogonal to the lateral and transverse directions. Thus, the optical electric field and the applied electric field are both aligned along the lateral direction in an embodiment. In order to maximize the index of refraction change produced by the applied electric field, the crystal structure of the isotope-enhanced cladding material is aligned as discussed above. As an example, BTO is characterized by a tetragonal crystal structure. Thus, for BTO, the c-axis is aligned along the lateral direction with the a-axes perpendicular to the lateral direction to achieve the largest Pockels effect, for example, by increasing the Pockels tensor components $r_{42}$ and $r_{51}$, which are equal for BTO.

In some embodiments utilizing materials with non-cubic crystal structures, the cladding material is formed such that half of the crystallographic domains are oriented with their c-axis in a first direction in-plane direction and half of the domains are oriented in a second in-plane direction perpendicular to the first direction. For these embodiments, for example, in embodiments utilizing BTO, the cladding material can be oriented such that the applied electric field and/or the optical electric field polarization are perpendicular to the vector bisecting the first direction and the second direction, i.e., oriented at 45° to the first direction and the second direction to provide a component of the applied electric field that utilizes the largest of the Pockels tensor components. Other materials can be oriented at other angles to enhance the Pockels effect as a function of the Pockels tensor characterizing the other materials. Thus, the index of refraction change due to the applied electric field is maximized by optimizing the utilization of the largest components of the Pockels effect tensors. One of ordinary skill in the art would recognize many variations, modifications, and alternatives.

Thus, some embodiments of the present invention utilize the electrode geometry (to define the orientation of the applied electric field), the crystal orientation of the isotope-enhanced cladding material (to define the Pockels material tensor alignment), and/or the waveguide geometry (to define the optical electric field polarization and light propagation direction) to ensure that the optimum index of refraction change resulting from the Pockels effect is achieved.

Figure 7:
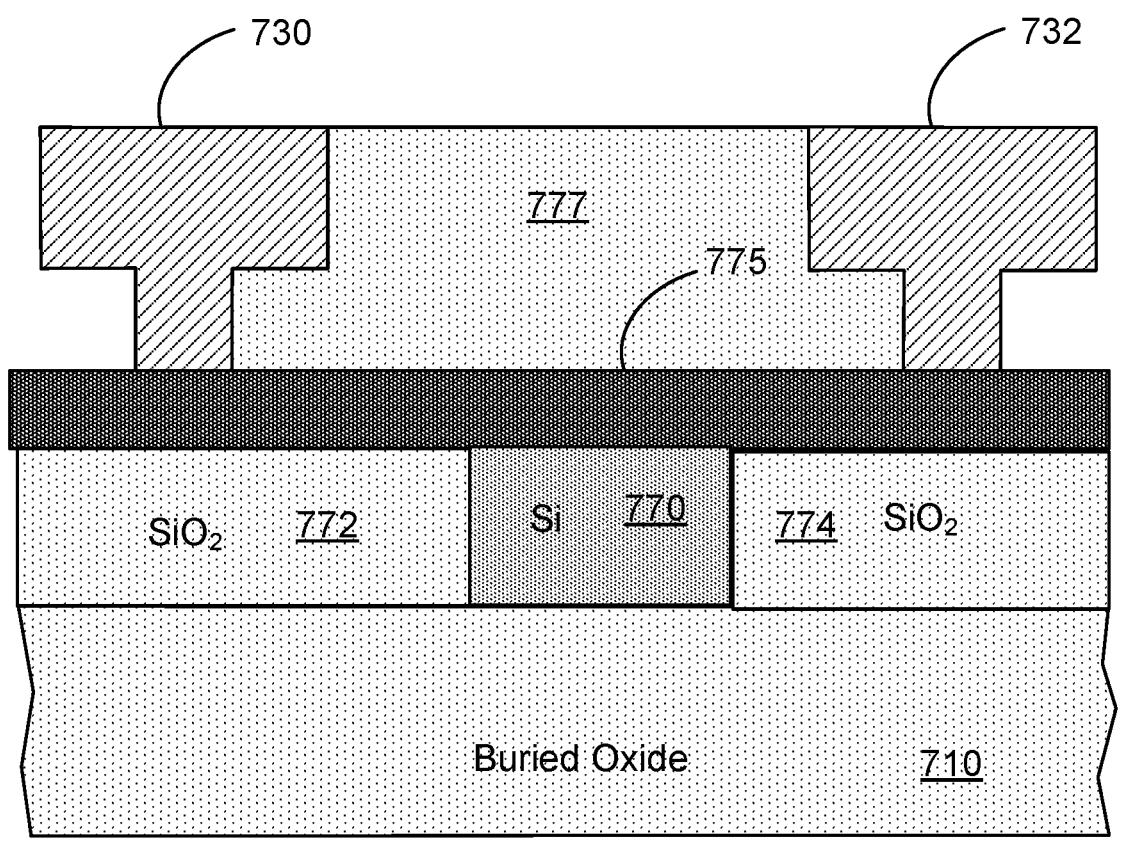
FIG. 7 is a simplified schematic diagram illustrating a buried waveguide structure incorporating a planar isotope-enhanced cladding layer according to an embodiment of the present invention.

FIG. 7 is a simplified schematic diagram illustrating a buried waveguide structure incorporating a planar isotope-enhanced cladding layer according to an embodiment of the present invention. The structure illustrated in FIG. 7 shares common elements with the structures illustrated in FIGS. 4 and 6 and the discussion provided in relation to FIGS. 4 and 6 is applicable to the structure illustrated in FIG. 7 as appropriate. For purposes of clarity, the conductivity type of the various materials is not illustrated in FIG. 7, but materials with differing conductivity as illustrated in FIGS. 4 and 6 can be utilized in the structure illustrated in FIG. 7 as appropriate.

As illustrated in FIG. 7, substrate 710 supports buried waveguide 770, which is illustrated as positioned between first dielectric region 772, which as illustrated in FIG. 7 can be $SiO_2$, and second dielectric region 774, which as illustrated in FIG. 7 can be $SiO_2$. These first and second dielectric regions 772 and 774 can be considered as a first portion of the waveguide cladding.

Isotope-enhanced cladding layer 775 is formed as a second portion of the waveguide cladding using a material with an isotope-enhanced Pockels effect. Isotope-enhanced cladding layer 775 can be deposited using a deposition process or can be transferred using a layer transfer process.

Isotope-enhanced cladding layer 775 is characterized by an isotope-enhanced Pockels effect that is greater than the Pockels effect associated with materials fabricated using constituent materials having naturally occurring isotope percentages. As an example, silicon can be utilized as waveguide core material 770, isotope-enhanced BTO can be utilized as isotope-enhanced cladding layer 775, and silicon dioxide ($SiO_2$) can be used as the material for first dielectric region 772 and second dielectric region 774 (i.e., the first portion of the waveguide cladding). As illustrated in FIG. 7, one or more additional cladding layers 777 can be formed on the first cladding layer to provide the desired optical confinement. As an example, silicon dioxide ($SiO_2$) can be deposited on isotope-enhanced cladding layer 775 to form additional cladding layer 777. The cladding materials can utilize suitable materials as discussed in relation to FIGS. 4 and 6.

In order to establish an applied electric field extending through the isotope-enhanced cladding layer 775 and waveguide core 770, a bias voltage is applied to electrodes 730 and 732, which can be metal electrodes or other suitable materials that provide electrical conductivity. In some embodiments, electrical contact is provided to the waveguide materials, which may include doped regions that form a p-n junction as illustrated in FIG. 4, in order to prevent carrier screening that may result from application of the electric field across the waveguide core.

Figure 8:
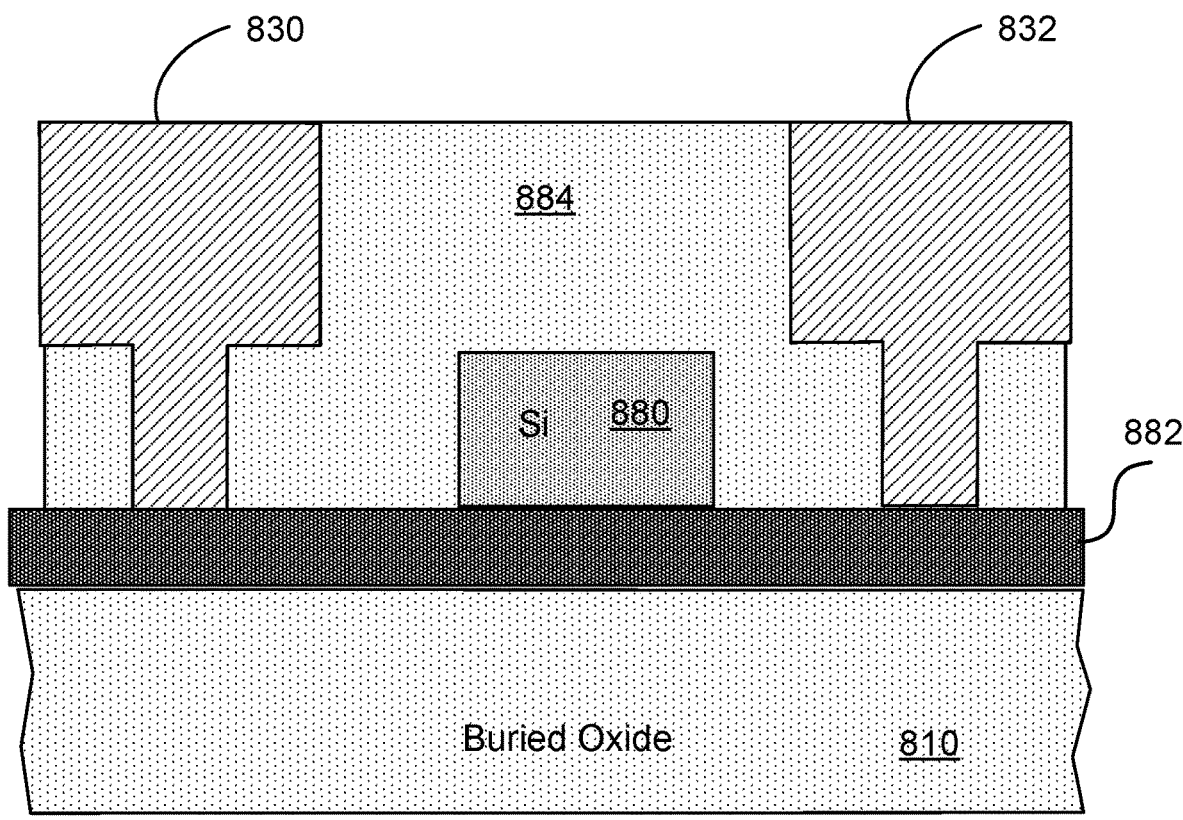
FIG. 8 is a simplified schematic diagram illustrating a buried waveguide structure incorporating a planar isotope-enhanced cladding layer according to another embodiment of the present invention.

FIG. 8 is a simplified schematic diagram illustrating a buried waveguide structure incorporating a planar isotope-enhanced cladding layer according to another embodiment of the present invention. The structure illustrated in FIG. 8 shares common elements with the structures illustrated in FIGS. 4, 6, and 7 and the discussion provided in relation to FIGS. 4, 6, and 7 is applicable to the structure illustrated in FIG. 8 as appropriate. For purposes of clarity, the conductivity type of the various materials is not illustrated in FIG. 8, but materials with differing conductivity as illustrated in FIGS. 4 and 6 can be utilized in the structure illustrated in FIG. 8 as appropriate. As illustrated in FIG. 8, substrate 810 supports buried waveguide 880, which is illustrated as positioned above a planar isotope-enhanced cladding layer 882 and partially surrounded by second cladding layer 884.

Planar isotope-enhanced cladding layer 882 is formed using a material with an isotope-enhanced Pockels effect. Planar isotope-enhanced cladding layer 882 can be deposited using a deposition process or can be transferred using a layer transfer process.

Planar isotope-enhanced cladding layer 882 is characterized by an isotope-enhanced Pockels effect that is greater than the Pockels effect associated with materials fabricated using constituent materials having naturally occurring isotope percentages. As an example, silicon can be utilized as the waveguide core material 880, isotope-enhanced BTO can be utilized as planar isotope-enhanced cladding layer 882, and silicon dioxide ($SiO_2$) can be used as the material for second dielectric layer 884. The cladding materials can utilize suitable materials as discussed in relation to FIGS. 4, 6, and 7.

In order to establish an applied electric field extending through isotope-enhanced cladding layer 882 and the waveguide core 880, a bias voltage is applied to electrodes 830 and 832, which can be metal electrodes or other suitable materials that provide electrical conductivity. In some embodiments, electrical contact is provided to the waveguide materials, which may include doped regions that form a p-n junction as illustrated in FIG. 4, in order to prevent carrier screening that may result from application of the electric field across the waveguide core.

Figure 9:
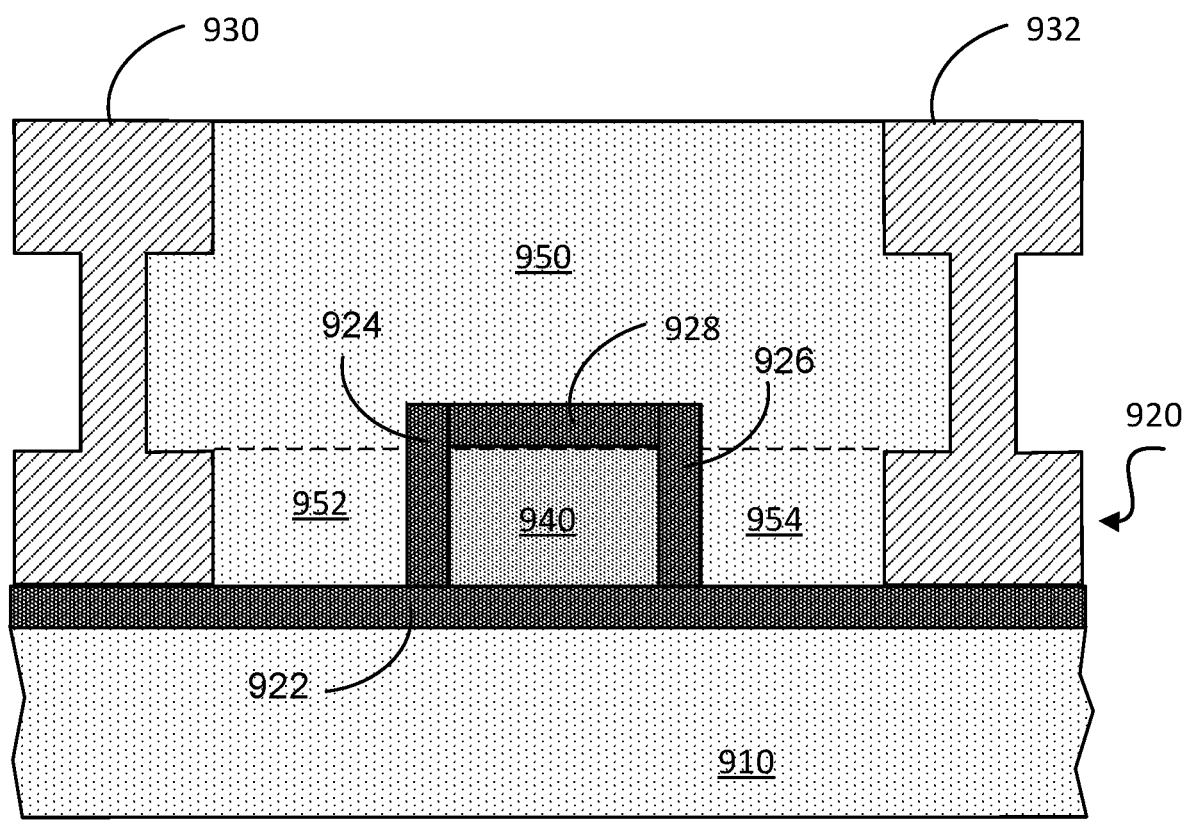
FIG. 9 is a simplified schematic diagram illustrating a dielectric-waveguide-dielectric structure incorporating isotope-enhanced cladding materials according to an embodiment of the present invention.

FIG. 9 is a simplified schematic diagram illustrating a dielectric-waveguide-dielectric structure incorporating isotope-enhanced cladding materials according to an embodiment of the present invention. The dielectric-waveguide-dielectric structure illustrated in FIG. 9 shares similarities with the dielectric-waveguide-dielectric waveguide structure illustrated in FIG. 6 and the discussion provided in relation to FIG. 6 is applicable to FIG. 9 as appropriate.

Referring to FIG. 9, the cross-section of the dielectric-waveguide-dielectric structure includes an illustration of substrate 910, which supports waveguide layer 920, which includes waveguide core 940. In some embodiments, substrate 910 is the buried oxide (BOX) layer of a silicon-on-insulator (SOI) structure, although this is not required by the present invention. Metal contacts 930 and 932 are provided to enable application of a voltage bias across waveguide core 940, which can be silicon.

The cladding material surrounding waveguide core 940 includes a first isotope-enhanced cladding layer 922 disposed below the waveguide core, lateral isotope-enhanced cladding layers 924 and 926 disposed on either side of the waveguide core, and second isotope-enhanced cladding layer 928 disposed above the waveguide core. In addition to first isotope-enhanced cladding layer 922, lateral isotope-enhanced cladding layers 924 and 926, and second isotope-enhanced cladding layer 928, proximal dielectric regions 950, 952, and 954 are disposed with one or more of the lateral isotope-enhanced cladding layers 924 and 926 or second isotope-enhanced cladding layer 928 between the proximal the dielectric regions and the waveguide core.

One of more of first isotope-enhanced cladding layer 922, lateral isotope-enhanced cladding layers 924 and 926, and second isotope-enhanced cladding layer 928 are characterized by an isotope-enhanced Pockels effect that is greater than the Pockels effect associated with materials fabricated using constituent materials having naturally occurring isotope percentages. In some embodiments, the isotope-enhanced Pockels effect material is utilized to form the waveguide core (e.g., waveguide core 940) and a suitable dielectric material with a lower index of refraction than the waveguide core is utilized as the cladding material.

As an example, silicon can be utilized as the waveguide core 940 and isotope-enhanced BTO can be utilized as first isotope-enhanced cladding layer 922, lateral isotope-enhanced cladding layers 924 and 926, and second isotope-enhanced cladding layer 928, and silicon dioxide ($SiO_2$) can be used as proximal dielectric regions 950, 952, and 954. Other suitable materials for first isotope-enhanced cladding layer 922, lateral isotope-enhanced cladding layers 924 and 926, and second isotope-enhanced cladding layer 928 and/or proximal dielectric regions 950, 952, and 954 include isotope-enhanced lead zirconate titanate ($Pb[Zr_{(x)}Ti_{(1-x)}]O_3$) (PZT), isotope-enhanced strontium barium niobate ($(Sr,Ba)Nb_2O_6$), combinations thereof, or the like.

Although different materials are illustrated for first isotope-enhanced cladding layer 922, lateral isotope-enhanced cladding layers 924 and 926, and second isotope-enhanced cladding layer 928 and proximal dielectric regions 950, 952, and 954, this is not required by the present invention and the same material can be utilized for both first isotope-enhanced cladding layer 922, lateral isotope-enhanced cladding layers 924 and 926, and second isotope-enhanced cladding layer 928 and proximal dielectric regions 950, 952, and 954. As an example, the entire cladding could be fabricated using isotope-enhanced BTO, in which case, there would be no distinction between first isotope-enhanced cladding layer 922, lateral isotope-enhanced cladding layers 924 and 926, and second isotope-enhanced cladding layer 928 and proximal dielectric regions 950, 952, and 954. In other embodiments, different compositions of the same material could be utilized as the various cladding materials. Moreover, although only two cladding layers are illustrated in FIG. 10, it will be appreciated that more than two cladding layers could be used, for example, a thin film of a first isotope-enhanced cladding material (e.g., isotope-enhanced BTO), a thin film of a second isotope-enhanced cladding material (e.g., isotope-enhanced PZT) deposited after the first isotope-enhanced cladding material, N additional thin films of subsequent cladding materials, which may or may not be isotope-enhanced, and a blanket coating of a final cladding material, which may or may not be isotope-enhanced. Moreover, although a single layer of cladding material is illustrated in FIG. 9 for first isotope-enhanced cladding layer 922, lateral isotope-enhanced cladding layers 924 and 926, and second isotope-enhanced cladding layer 928, these single "layers" can be made up of multiple sub-layers of different materials or the same material. One of ordinary skill in the art would recognize many variations, modifications, and alternatives.

It should be noted that a "vertical" implementation of the dielectric-waveguide-dielectric structure incorporating isotope-enhanced Pockels effect materials illustrated in FIG. 9 is included within the scope of the present invention. Proximal dielectric region 952 and 954, as well as waveguide core 940 can be formed using epitaxial processes to form a vertical implementation that will share common elements with the embodiment illustrated in FIG. 9 and provide benefits of smaller device geometry as well as other benefits. One of ordinary skill in the art would recognize many variations, modifications, and alternatives.

Figure 10A:
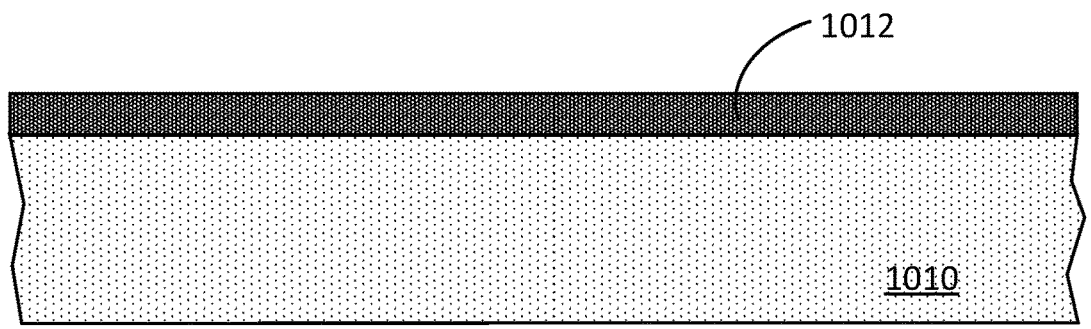
FIGS. 10A-10C are simplified schematic diagrams illustrating fabrication of an isotope-enhanced semiconductor structure according to an embodiment of the present invention.
Figure 10B:
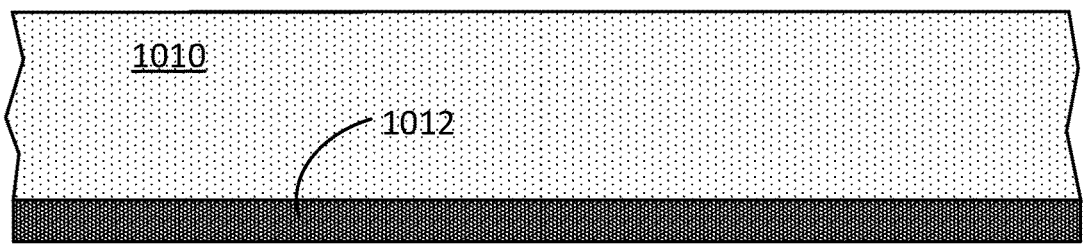
Figure 10C:
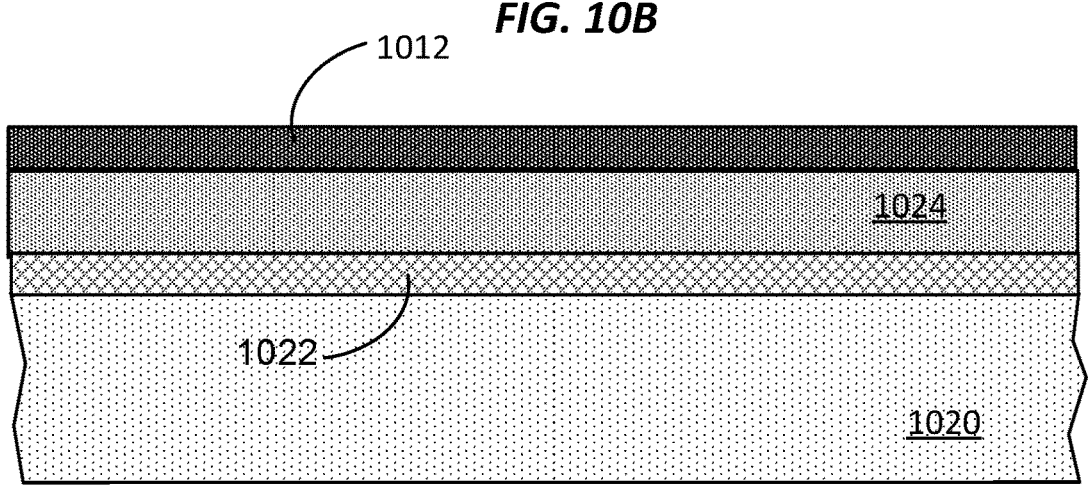

FIGS. 10A-10C are simplified schematic diagrams illustrating fabrication of an isotope-enhanced semiconductor structure according to an embodiment of the present invention. In FIG. 10A, a handle substrate 1010, for example, a silicon handle substrate, supports an isotope-enhanced Pockels effect layer 1012. As an example, isotope-enhanced Pockels effect layer 1012 can be formed as a thin film of at least one of isotope-enhanced BTO, isotope-enhanced PZT, isotope-enhanced SBN, combinations thereof, or the like. Isotope enhanced Pockels effect layer 1012 can be fabricated using various techniques including deposition and layer transfer processes FIG. 10B illustrates wafer scale bonding of an isotope-enhanced semiconductor structure to a substrate structure according to an embodiment of the present invention. In FIG. 10B, isotope-enhanced Pockels effect layer 1012 of an isotope-enhanced semiconductor structure including handle substrate 1010 is wafer scale bonded to a substrate structure in the form of an SOI substrate with silicon substrate 1020, buried oxide layer 1022, and single crystal silicon layer 1024. In other embodiments, other substrate structures other than SOI substrates are utilized. FIG. 10C illustrates the isotope-enhanced semiconductor structure formed following wafer scale bonding. The isotope-enhanced semiconductor structure includes silicon substrate 1020, buried oxide layer 1022, single crystal silicon layer 1024, and isotope-enhanced Pockels effect layer 1012.

Thus, embodiments of the present invention provide an isotope-enhanced semiconductor structure that includes a silicon substrate structure and an isotope-enhanced Pockels effect layer coupled to the silicon substrate structure. Although isotope-enhanced Pockels effect layer 1012 is illustrated as being bonded to single crystal silicon layer 1024 in FIG. 10C, this is not required by the present invention and suitable buffer layer(s) can be utilized during the wafer scale bonding process. Moreover, although a layer transfer process is illustrated in FIGS. 10A-10C, fabrication of the isotope-enhanced semiconductor structure is not limited to this particular fabrication process and other processes, including deposition and the like are included within the scope of the present invention.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An optical switch structure comprising:
   a substrate;
   a first electrical contact;
   a first material having a first conductivity type electrically connected to the first electrical contact;
   a second material having a second conductivity type coupled to the first material;
   a second electrical contact electrically connected to the second material; and
   a waveguide structure disposed between the first electrical contact and the second electrical contact and comprising:
      a waveguide core coupled to the substrate and including a core material characterized by a first index of refraction; and
      a waveguide cladding at least partially surrounding the waveguide core and including a cladding material characterized by a second index of refraction less than the first index of refraction and an isotope-enhanced Pockels effect.

2. The optical switch structure of claim 1 wherein the isotope-enhanced Pockels effect is greater than a Pockels effect of the cladding material using constituent materials having naturally occurring isotope percentages.

3. The optical switch structure of claim 2 wherein one or more constituent atoms of the waveguide cladding are characterized by an isotope percentage greater than a naturally occurring isotope percentage of the one or more constituent atoms.

4. The optical switch structure of claim 1 further comprising a second cladding layer coupled to the waveguide cladding.

5. The optical switch structure of claim 4 wherein the waveguide core comprises silicon, the waveguide cladding comprises isotope-enhanced barium titanate and the second cladding layer comprises silicon dioxide.

6. The optical switch structure of claim 1 wherein the cladding material is characterized by a $\chi^{(3)}$ value greater than $2.2 \times 10^{-18}$ m$^2$/W.

7. The optical switch structure of claim 1 wherein the cladding material comprises at least one of isotope-enhanced barium titanate ($BaTiO_3$) or isotope-enhanced lead zirconate titanate (PZT).

8. The optical switch structure of claim 1 wherein the waveguide structure comprises a Mach-Zehnder interferometer.

9. The optical switch structure of claim 1 wherein the waveguide structure comprises a ring resonator.

10. The optical switch structure of claim 1 wherein the core material comprises silicon.

11. The optical switch structure of claim 1 wherein the core material consists of silicon.

12. The optical switch structure of claim 1 wherein the cladding material comprises $HfO_2$.

13. The optical switch structure of claim 1 wherein the cladding material comprises $Ta_2O_5$.

* * * * *